S. H. GAINOR.
CLAMP FOR HOLDING DRIVE CHAINS WHILE REPAIRING THE SAME.
APPLICATION FILED AUG. 18, 1920.
1,373,230. Patented Mar. 29, 1921.
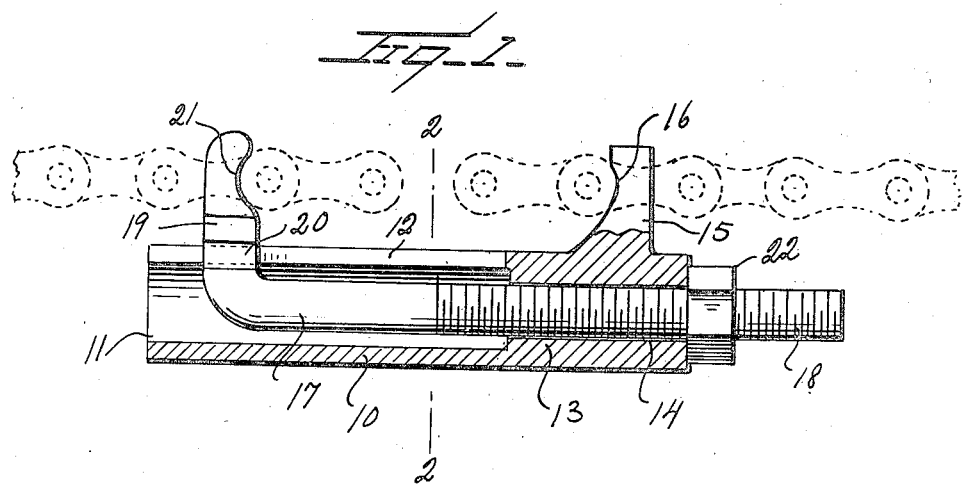
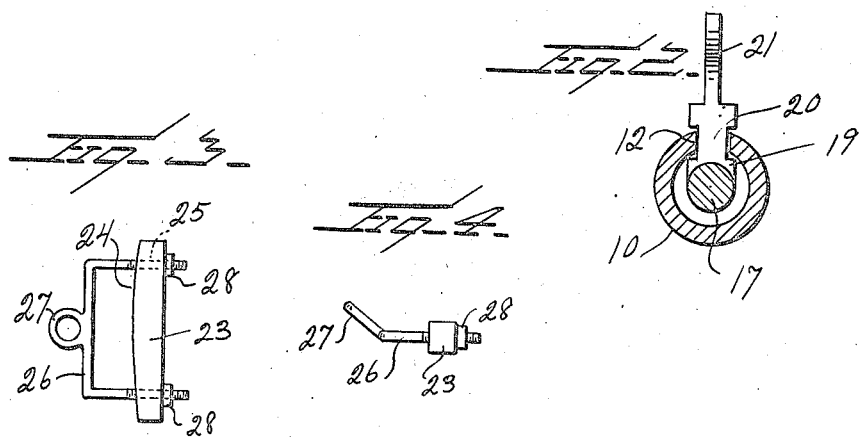
Inventor
S. H. Gainor
By Watson E. Coleman
Attorney

UNITED STATES PATENT OFFICE.

SUMMERS H. GAINOR, OF BALTIMORE, MARYLAND.

CLAMP FOR HOLDING DRIVE-CHAINS WHILE REPAIRING THE SAME.

1,373,230.  Specification of Letters Patent.  Patented Mar. 29, 1921.

Application filed August 18, 1920. Serial No. 404,470.

*To all whom it may concern:*

Be it known that I, SUMMERS H. GAINOR, a citizen of the United States, residing at Baltimore and State of Maryland, have invented certain new and useful Improvements in Clamps for Holding Drive-Chains While Repairing the Same, of which the following is a specification, reference being had to the accompanying drawings.

This invention relates to improvements in clamps for holding drive chains while repairing the same.

An important object of the invention is to provide a device of this kind which may be readily applied to a broken chain to hold the parts of the same in position for the insertion of a new link.

A further object of this invention is to provide a device of this character which is extremely simple in construction and operation and which is composed of a minimum number of parts.

Other objects and advantages of the invention will become apparent throughout the course of the following description.

In the accompanying drawings wherein for the purpose of illustration is shown a preferred embodiment of my invention and wherein like reference characters designate like parts throughout:

Figure 1 is a longitudinal sectional view taken through a clamp constructed in accordance with my invention.

Fig. 2 is a section on the line 2—2 of Fig. 1.

Fig. 3 is a side elevation of a clamp employed in conjunction with my chain clamp, and Fig. 4 is a top plan view of the clamp shown in Fig. 3.

Referring now more particularly to the drawings the numeral 10 indicates a tube having one end open as at 11. The tube is provided with longitudinally extending slot 12 one end of which extends to the open end 11 of the tube. The opposite end of the tube has inserted therein a plug 13 provided with a bore 14 for a purpose presently to appear. This plug may be secured in position in any desired manner as by welding or may be formed integrally with the tube as illustrated. Extending upwardly from this tube at the end thereof provided with the plug 13 is a member 15 provided in the side thereof directly toward the open end of the tube with a notch 16 for a purpose hereinafter to appear. A coacting member 17 is adapted to be slidably received within the bore of the plug 13 and has one end provided with screw threads 18. The opposite end is provided with an upturned portion 19 embodying a portion 20 adapted to slidably fit the slot 12 of the tube 10. This upturned portion is provided in the face thereof disposed toward the threaded end with a notch 21 for a purpose presently to appear. This member 17, as will be obvious, is adapted to be inserted within the tube with the threaded end thereof extending through the bore 14 of the plug and with the vertical portion 19 thereof disposed within the slot. The nut 22 is placed upon the threaded end of the member 17 and abuts the plug 13 for use in adjusting the member 17.

In use the members 15 and 19 are inserted through the space in the links of the broken chain and the nut 22 tightened to cause the member 19 to move toward the member 15, thereby tightening the chain and permitting, intermediate these members, sufficient slack to allow the insertion of a new link. The notches 16 and 21 engaging the surface of the links prevent extendedly downward displacement of the clamp.

In some forms of chains there is not sufficient space intermediate the links to permit the insertion of a clamp arm of sufficient strength to tighten the chain. With chains of this type I employ the device illustrated in Figs. 3 and 4 of the drawings. This device consists of a plate 23 having a rounded face 24 adapted to contact with a chain and provided adjacent its ends with openings 25. This plate may be formed of any suitable material, fiber, hard wood, or the like. A U-bolt is provided having formed in the base of the U a loop 27 which is angularly disposed for the purpose of permitting the insert therein of the members 16 and 19. The U-bolt is arranged upon one side of the chain and the plate upon the opposite side, the arms of the U extending through the openings 25 and receiving nuts 28 whereby the device may be clamped about the chain. Two of the devices are employed, one being used upon each end of the chain and the members 15 and 19 are entered in the loops 27 thereof and tightened as hereinbefore described.

It will be obvious that my device is by reason of its simplicity, efficiency, and ease of manufacture particularly well adapted for use and it will likewise be obvious that the same is capable of some change without departing from the spirit of my invention. I accordingly do not limit myself to the specific construction hereinbefore set forth but may make any such change without departing from the spirit of the invention or the scope of the subjoined claims.

Having now described my invention what I claim is:

1. In a chain clamp, a tubular member provided with a longitudinal slot and with an upstanding portion alined with said slot, a member slidably mounted within said tubular member and having a portion extending upwardly through said slot, and means engaging the slidably mounted member and abutting the tubular member for adjustably positioning said slidably mounted member.

2. In a chain clamp, a tubular member having one end thereof open and the other end provided with a closure having a bore co-axial with the member, said member being provided with a longitudinal slot communicating with the open end thereof and with an upstanding portion alined with said slot and provided in the face thereof disposed toward the slot with a notch, a coacting member slidably mounted within said tubular member and having one end extending through said bore and provided with screw threads, a nut mounted on said screw threads and abutting the closure of the adjacent end of the tubular member, the opposite end of said slidably mounted member being angularly disposed and extending through said slot and being provided with portions slidably engaging the sides of said slot, said angularly disposed portion being provided in the face thereof disposed toward the threaded end with a notch.

In testimony whereof I hereunto affix my signature.

SUMMERS H. GAINOR.